(12) United States Patent
Ketterer et al.

(10) Patent No.: US 7,568,865 B1
(45) Date of Patent: Aug. 4, 2009

(54) THREAD FORMING TOOL ASSEMBLY

(76) Inventors: John T. Ketterer, 6355 Chestnut Blvd., Cass City, MI (US) 48726; Ronald L. Champagne, 424 E. Butler 6B, Bad Axe, MI (US) 48413; Wallace G. Wojtaszek, 312 Birchknoll, Caro, Michigan, MI (US) 48723; Allen A. McBride, W208 N6954 Fillmore Dr., Menomonee Falls, MI (US) 53051-4706

( * ) Notice: Subject to any disclaimer, the term of this patent is extended or adjusted under 35 U.S.C. 154(b) by 0 days.

(21) Appl. No.: 11/225,798

(22) Filed: Sep. 12, 2005

Related U.S. Application Data

(60) Provisional application No. 60/609,097, filed on Sep. 10, 2004.

(51) Int. Cl.
*B26D 1/00* (2006.01)
*B26D 7/00* (2006.01)

(52) U.S. Cl. ........................................ 407/101; 407/47

(58) Field of Classification Search ................. 409/132; 408/315, 233, 222; 407/101, 104, 120, 47, 407/38
See application file for complete search history.

(56) References Cited

U.S. PATENT DOCUMENTS

| | | | |
|---|---|---|---|
| 992,860 A | 5/1911 | Dette | |
| 1,063,680 A | 6/1913 | Hartness | |
| 1,148,597 A | 8/1915 | Lewis | |
| 1,468,774 A | 9/1923 | Caldwell | |
| 1,701,775 A | * 2/1929 | Hall | 408/215 |
| 1,838,520 A | 12/1931 | Archer | |
| 4,117,563 A | * 10/1978 | Fredd | 470/80 |
| 4,409,868 A | * 10/1983 | Huddle et al. | 82/1.11 |
| 4,607,988 A | * 8/1986 | Salm et al. | 407/114 |
| 5,088,861 A | * 2/1992 | Little | 407/11 |
| 5,322,395 A | * 6/1994 | Cole | 407/99 |
| 6,619,892 B2 | * 9/2003 | Enquist | 407/36 |

* cited by examiner

*Primary Examiner*—Willmon Fridie
(74) *Attorney, Agent, or Firm*—Robert L. Farris; Farris Law, P.C.

(57) ABSTRACT

The thread forming tool assembly includes a steel holder block, a carbide tool and a threaded fastener. The steel holder block has block top, bottom, first side, second side, base end and a carbide tool engaging end. A tool engaging end, of the holder block includes a first holder tool engaging surface and a second holder tool engaging surface that diverge from each other. A carbide tool has a first holder engaging surface that engages the first holder tool engaging surface and a second holder engaging surface that engages the second holder tool engaging surface. Thread forming exerts forces on the carbide tool that urge the first and second holder engaging surfaces toward engagement with the tool engaging end of the holder block.

2 Claims, 5 Drawing Sheets

THREAD FORMING TOOL ASSEMBLY

CROSS REFERENCE TO RELATED APPLICATION

This application claims the benefit of the filing date of U.S. Provisional Application No. 60/609,097, titled "Thread Forming Tool Assembly," filed Sep. 10, 2004.

FIELD OF THE INVENTION

The thread forming tool assembly includes a tool holder and a carbide tool clamped to the tool holder that is mountable in a thread forming head such as a thread chaser.

BACKGROUND OF THE INVENTION

Thread farming tools such as metal chip forming chaser heads employ a plurality of tool holder assemblies. Each tool holder assembly includes a steel tool holder and a carbide tool for cutting threads. The carbide tool is fixed to the steel tool holder by brazing. The carbide tool is used to increase tool life and to permit the formation of threads on parts made from steel and other difficult to cut materials.

Each tool holder assembly could be made entirely from carbide. However carbide is an expensive material. To reduce the cost, a carbide tool is fixed to a steel holder as described above. When the carbide tool becomes unuseable due to wear and can not be reground again, the entire tool holder assembly is discarded. The steel holder can not be used again because the brazed connection between the steel holder and the carbide tool is permanent. The holder is relatively expensive due to the multiple machined surfaces and the hardness of the steel.

SUMMARY OF THE INVENTION

The thread forming tool assembly includes a reusable steel holder and a replaceable carbide tool. The carbide tool is clamped to the steel holder by a mechanical fastener member. Mating surfaces on the steel holder and the carbide tool position the tool relative to the steel holder. These mating surface position the carbide tool angularly about an axis and axially relative to the axis. The mechanical fastener prevents separation of the mating surfaces on the carbide tool from the mating surfaces on the steel holder. Work forces on the carbide tool complement the mechanical fastener and urge mating surfaces on the carbide tool toward mating surfaces on the steel tool holder.

The thread forming tool assembly for thread chaser heads includes a steel holder block with a bottom, a top, a base end, a tool carrier end, a first side wall and a second side wall. A chaser head engaging flat bottom surface on the bottom, a chaser head engaging flat side surface on the first side wall, and a chaser head clamp engaging flat surface on the second side wall are provided on the steel holder block. A holder accurate surface on the tool carrier end of the steal holder block faces away from the base end, and has a fixed radius about an accurate surface axis that is in a plane that is parallel to the chaser head engaging flat bottom surface and spaced from said top on the opposite side of the top from said bottom. A radially extending stop surface intersects the accurate surface at a valley and extending radially toward a stop surface axis that is vertically spaced above and parallel to the accurate surface axis. The radially extending stop surface terminates at a ridge on the tool carrier end, a threaded bore in the steel holder block, and a holder pin bore in the steel holder block intersects the holder accurate surface.

A carbide tool includes an accurate tool surface that engages the holder accurate surface on the steel holder block. A tool stop surface engages the radially extending stop surface on the steel holder block. A tool pin slot in the holder accurate surface receives the tool pin mounted in the holder pin bore, A carbide tool thread forming surface is intersected by the accurate tool surface and has a plurality of grooves in the carbide tool thread forming surface that form a plurality thread forming ridges that form threads on work-pieces. A screw engages the threaded bore in the steel holder block and clamps the carbide tool in the valley in the steel holder block

BRIEF DESCRIPTION OF DRAWINGS

These and other objects, features and advantages of this invention will become readily apparent in view of the following detailed description of the preferred embodiments and best mode, appended claims and accompanying drawings, in which:

DETAILED DESCRIPTION OF THE PREFERRED EMBODIMENTS

Figure 7:
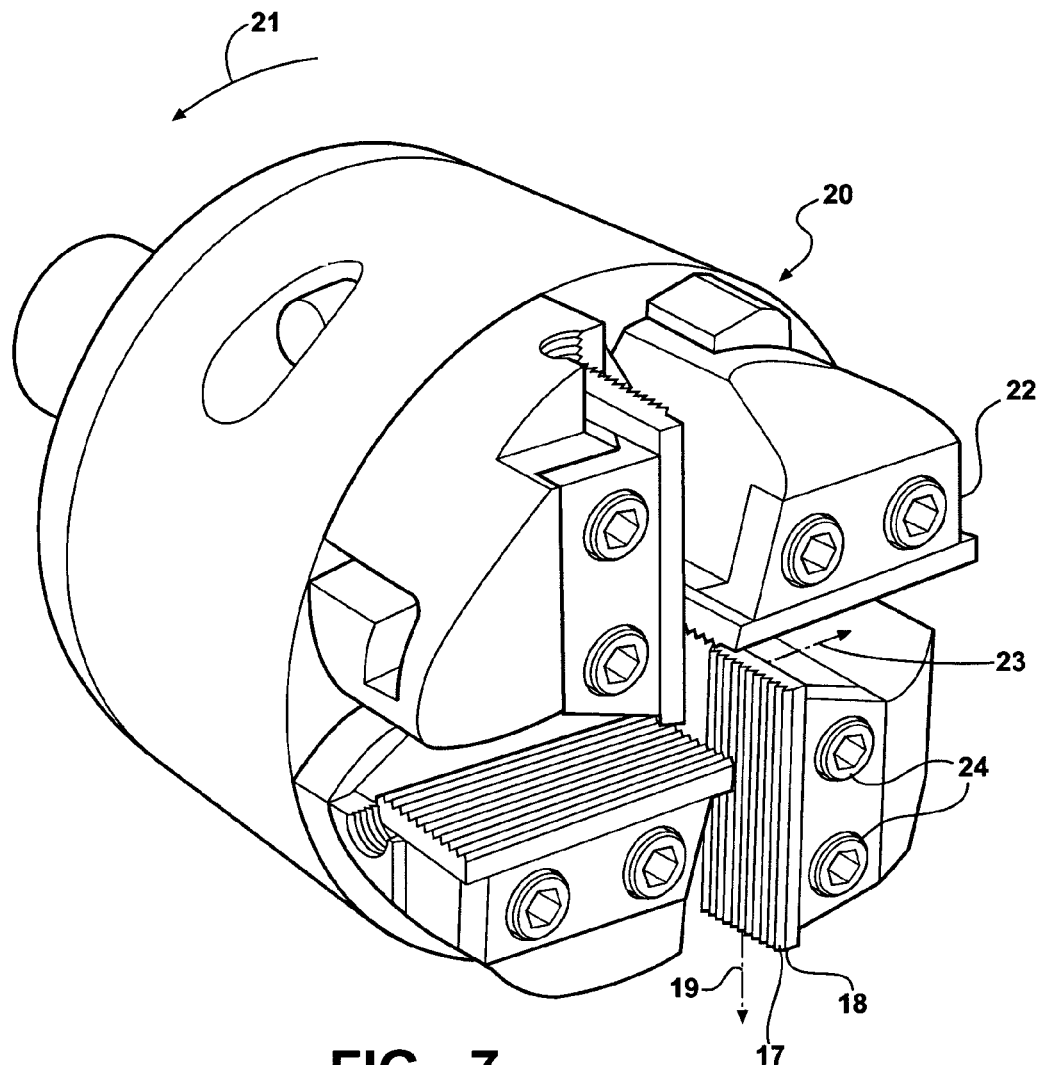
FIG. 7 is a prior art LANCO receding chaser head for precision tapered threads that can employ the tool holder and carbide tool described below.
Figure 8:
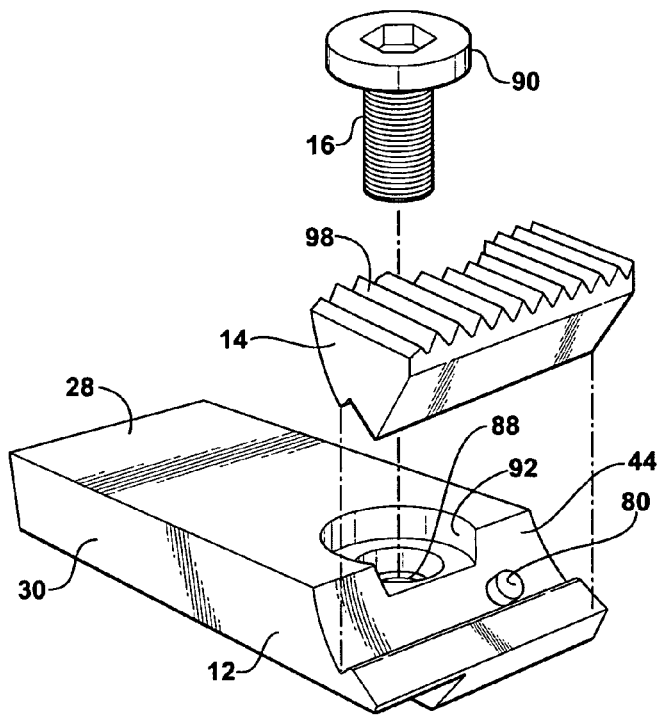
FIG. 8 is an expanded view of the thread forming tool assembly for the chaser head shown in FIG. 7.

The thread forming tool assembly 10 includes a reusable steel tool holder 12 and a replaceable carbide tool 14. The carbide tool is clamped to the holder 12 by a threaded fastener 16 that screws into the holder. A thread forming tool assembly 10 replaces each of the steel cutting tools 18 clamped to the chaser head 20 shown in FIG. 7. Clamp 22 and threaded fasteners 24 position and hold each cutting tool 18, or the thread forming tool assembly 10, on the chaser head 20. A thread chaser head 20, shown in FIG. 7 cuts to remove some material and also displaces some material to form threads. The ridges 17 in the cutting tool 18 displace material on a work piece as the chaser head 20 rotates in a counter clockwise direction, as indicated by the arrow 21, relative to the work-piece. The primary forces acting on the cutting tools 18, are parallel to the ridges 17, as indicated by the arrow 19 and perpendicular to the ridges and toward the clamp 22 as indicated by the arrow 23.

Figure 1:
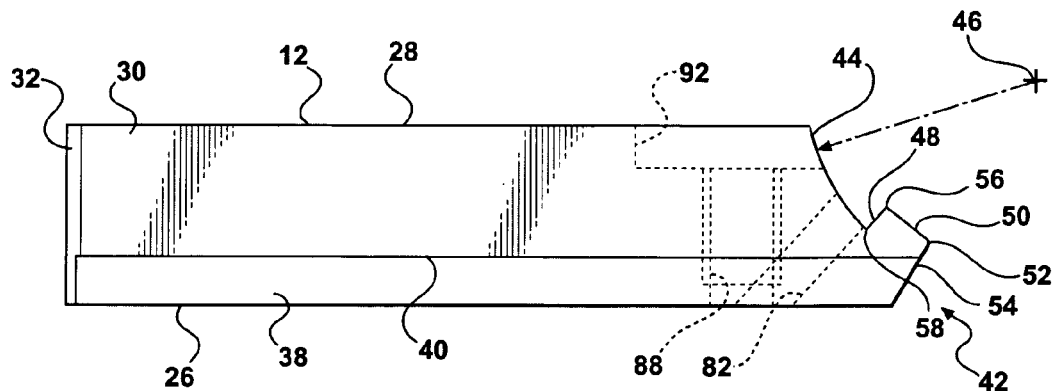
FIG. 1 is a perspective elevational view of the tool holder taken along a line that is parallel to the carbide tool engaging surfaces on the front end of the holder.
Figure 2:
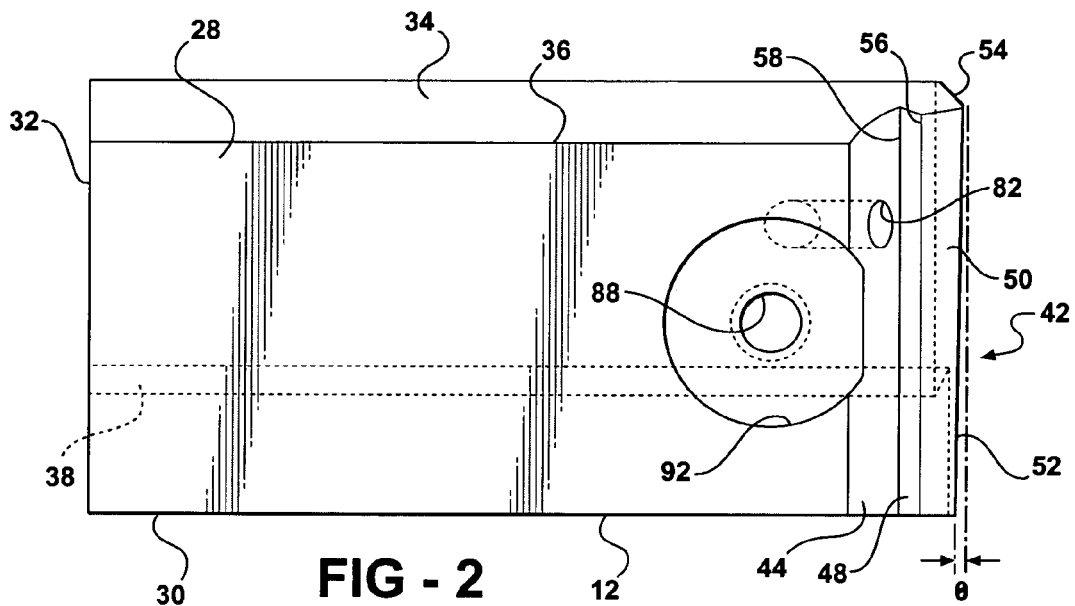
FIG. 2 is a top plan view of the tool holder.
Figure 3:
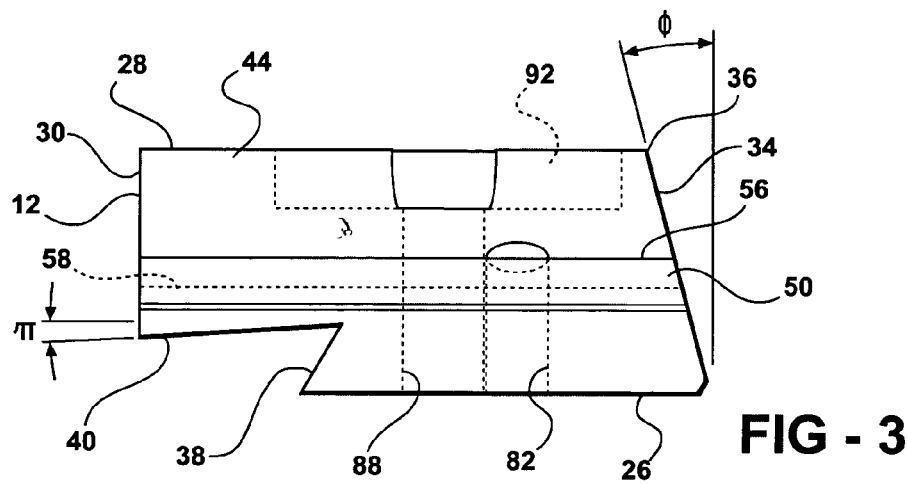
FIG. 3 is a front end elevational view of the tool holder.

The reusable steel holder 12, shown in FIGS. 1, 2 and 3 is a six sided block with a flat bottom wall 26, and a flat top wall 28 that is parallel to the bottom wall. A first side wall 30 is in a plane that is perpendicular to the bottom wall 26 and the top wall 28. A base wall 32 is perpendicular to the first side wall 30 and to the top wall 28. The second side wall 34 extends from the bottom wall 26 to the top wall 28 at an angle φ as shown in FIG. 3. The wall 34 is perpendicular to a plane including the base wall 32. The edge 36 at the junction of the second side wall 34 and the top wall 28 is parallel to the first side wall 30.

A portion of the bottom wall 26 and the first side wall 30 is removed to from an angled wall 38 and a clamp relief wall 40. The angled wall 38 cooperates with the second side wall 34 to form a dove tail. The second side wall 34 engages a flat angled surface in the head chaser 20 and the clamp 22 engages the angled wall 38 to hold and position the reusable steel holder 12 in a chaser head 20. The clamp relief wall 40 extends at an angle π from the first side wall 30 to the angled wall 38 to provide clearance for the clamp 22.

The carbide tool engaging surfaces on an end 42 of the reusable holder 12 opposite the base wall 32 extends at an angle θ relative to a line perpendicular to the first side wall 30 as shown in FIG. 2. The angle θ provides to a lead angle for the thread cutting surfaces on the carbide tool 14. The carbide tool engaging surfaces include a holder arcuate surface 44 that is an arc about an axis 46. The axis 46 is parallel to a plane that includes the top wall 28 of the reusable steel tool holder 12. The axis 46 is also at the angle θ as described above. A stop surface 48 extends generally radially inward from the arcuate surface 44 and forms a retainer pocket. As shown in FIG. 1, the stop surface 48 is in a plane that extends to the left and above the axis 46. As a result, the stop surface 48 tends to urge a carbide tool 14 toward the arcuate surface 44 due to the forces on the carbide tool during thread forming operations. A flat tool support surface 50 extends at a right angle from the stop surface 48 and away from the arcuate surface 44. The flat tool support surface 50 ends at ridge 52 that is the point on the tool holder 12 spaced the greatest distance from the base wall 32. A chip contact surface 54 extends from the ridge 52 toward the bottom wall 26 and the base wall 32.

The ridge 52, the ridge 56 and the valley 58 are parallel to the axis 46. FIG. 1 of the drawing is drawn looking in a direction parallel to the axis 46. The arcuate surface 44 is therefore a line in FIG. 1 and the base wall 32 is shown as a surface.

Figure 4:
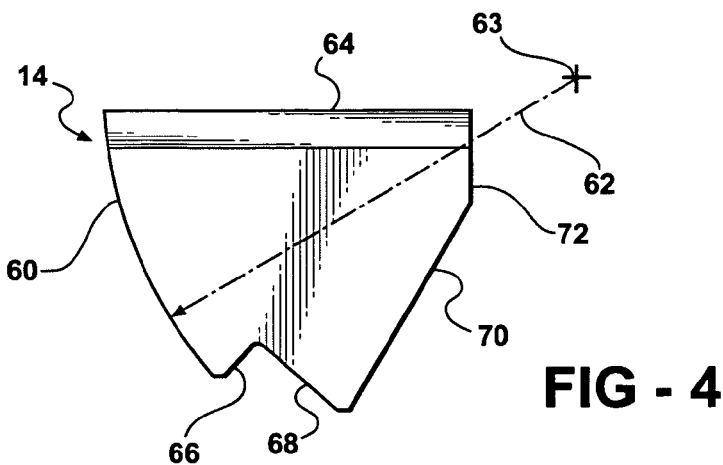
FIG. 4 is an enlarged end view of the carbide tool.
Figure 5:
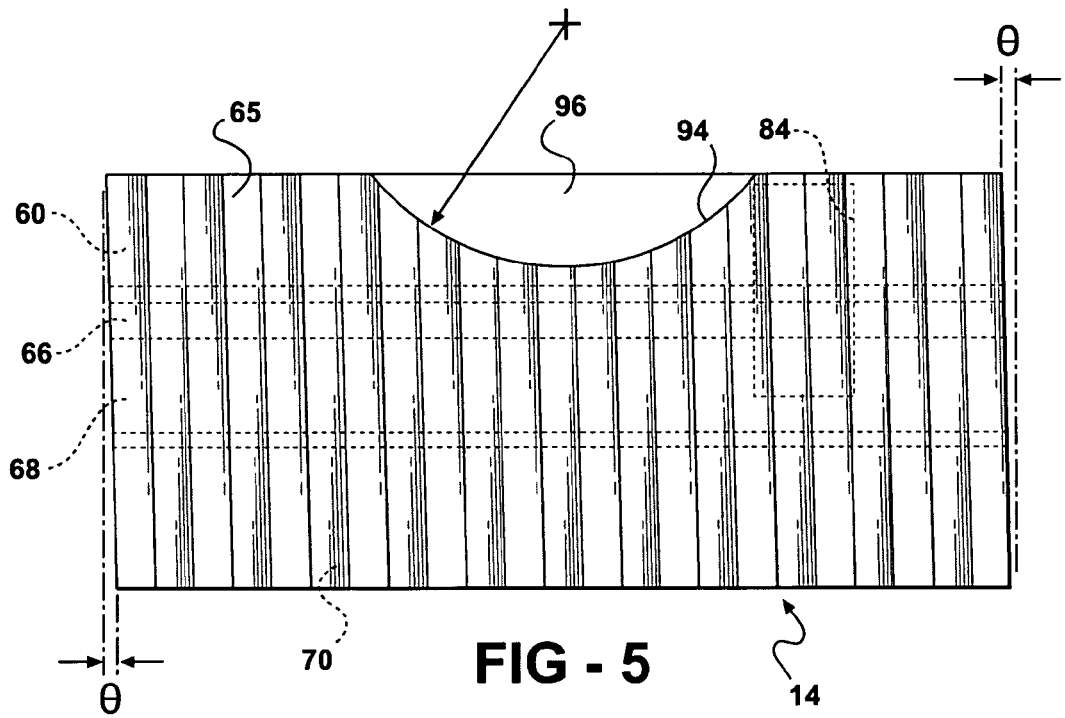
FIG. 5 is a top plan view of the carbide tool.
Figure 6:
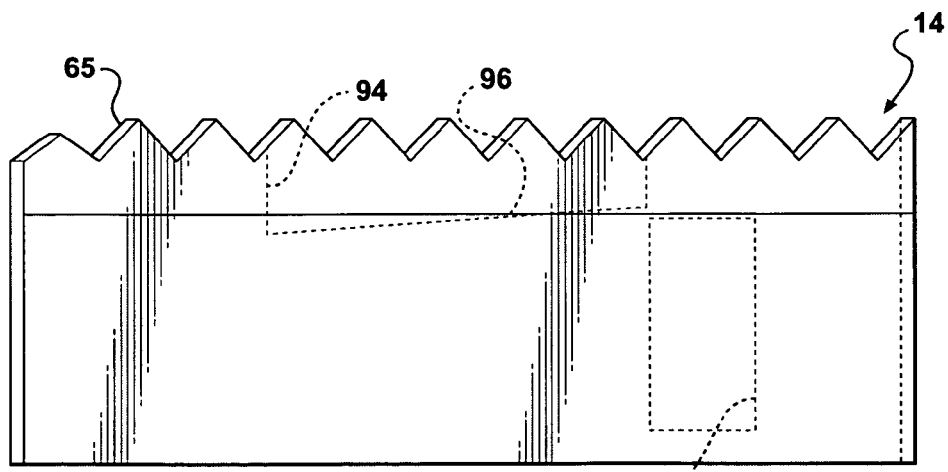
FIG. 6 is a front elevation view of the carbide tool.

The carbide tool 14 shown in FIGS. 4, 5 and 6 has a tool arcuate surface 60 that is an arc about an axis 63 with a fixed radius 62. The upper edge of the arcuate surface 60 ends at a flat wall 64 before thread forming grooves are ground into the surface to form thread-forming ridges 65. The lower edge of the arcuate surface ends at a tool stop surface 66. The tool stop surface 66 extends radially from the arcuate surface 60 toward an axis above the axis 63. A flat tool support surface 68 joins the tool stop surface 66 and extends transverse to the stop surface 66. A tool chip deflecting surface 70 extends from the tool support surface 68 to a tool face 72. The tool face 72 extends from the tool chip deflecting surface 70 to the flat wall 64 and intersects the flat wall at a right angle.

The carbide tool 14 is formed as a tool blank initially. The flat wall 64 and the face 72 of the carbide tool are ground as required to form a thread with the desired thread shape or profile, thread pitch and thread depth.

The carbide tool 14, with the wall 64 and face 72 ground to the desired shape, is positioned on the steel tool holder 12. The tool arcuate surface 60 is in contact with the holder arcuate surface 44. The tool stop surface 66 is in engagement with the stop surface 48 on the tool holder 12 thereby holding the carbide tool 14 in the proper angular position relative to the tool holder and the axis 46. A pin 80 in the holder pin bore 82 and in the tool pin slot 84 fix the position of the carbide tool 14 relative to the axis 46. A threaded fastener 16 screws into a threaded bore 88 in the tool holder 12. The head 90 of the threaded fastener 16 is received in the recess 92 in the tool holder 12 and the recess 94 in the carbide tool 14 and clamps the carbide tool to the tool holder. The head 90 of the threaded fastener cooperates with the angled floor 96 of the recess 94 to urge the carbide tool toward the pin 80 in the holder pin bore 82 and the tool pin slot 84. The thread forming ridges 98, advance a work-piece during relative movement between the chaser head and the work-piece during thread forming operations. There is some force on the thread forming tool assembly 10 to advance a work-piece relative to the chaser head. The transverse force is generally parallel to the axis 46 shown in FIG. 1 and to the pin 80. The pin 80 is sufficient to transmit the small transverse force from the carbide tool 14 to the steel tool holder.

A thread forming tool assembly 100 for use with a second chaser head construction (not shown) includes a reusable steel tool holder 112 and a replaceable carbide tool 114. The tool holder 112, shown in FIG. 9, has an end 142 with tool engaging surfaces 144 and 148. Three chaser head engaging surfaces 126, 134, and 138 are provided for attaching the thread forming assembly to the chaser head. A tool holder flat surface 144 on the tool holder is parallel to the bottom wall 126. A flat stop surface 148 extends upwardly from the flat surface 144 at an acute angle. A threaded bore 188 is provided in the center portion of the flat surface 144. A holder pin bore 182 for a dowel pin 180 is also provided in the flat surface. A carbide tool 114 with six sides includes a flat bottom surface 156 that engages the tool holder surface 144 and a wall 113 that engages the stop surface 148. A slot 84 in the carbide tool 114 receives the dowel pin 180. A screw bore 185 with a counter sunk upper end passes through the carbide tool 114. A threaded fastener 116 holds the carbide tool 114 on the tool holder 112. Thread forming ridges 198 are formed in the upper surface of the carbide tool 114.

Figure 9:
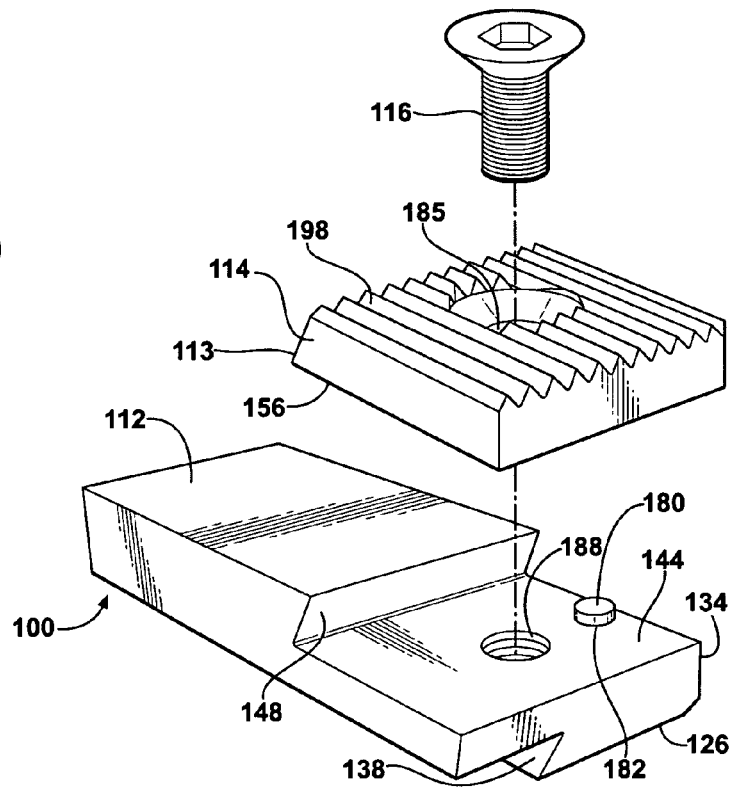
FIG. 9 is an expanded view of a thread forming tool for a different chaser head construction.
Figure 10:
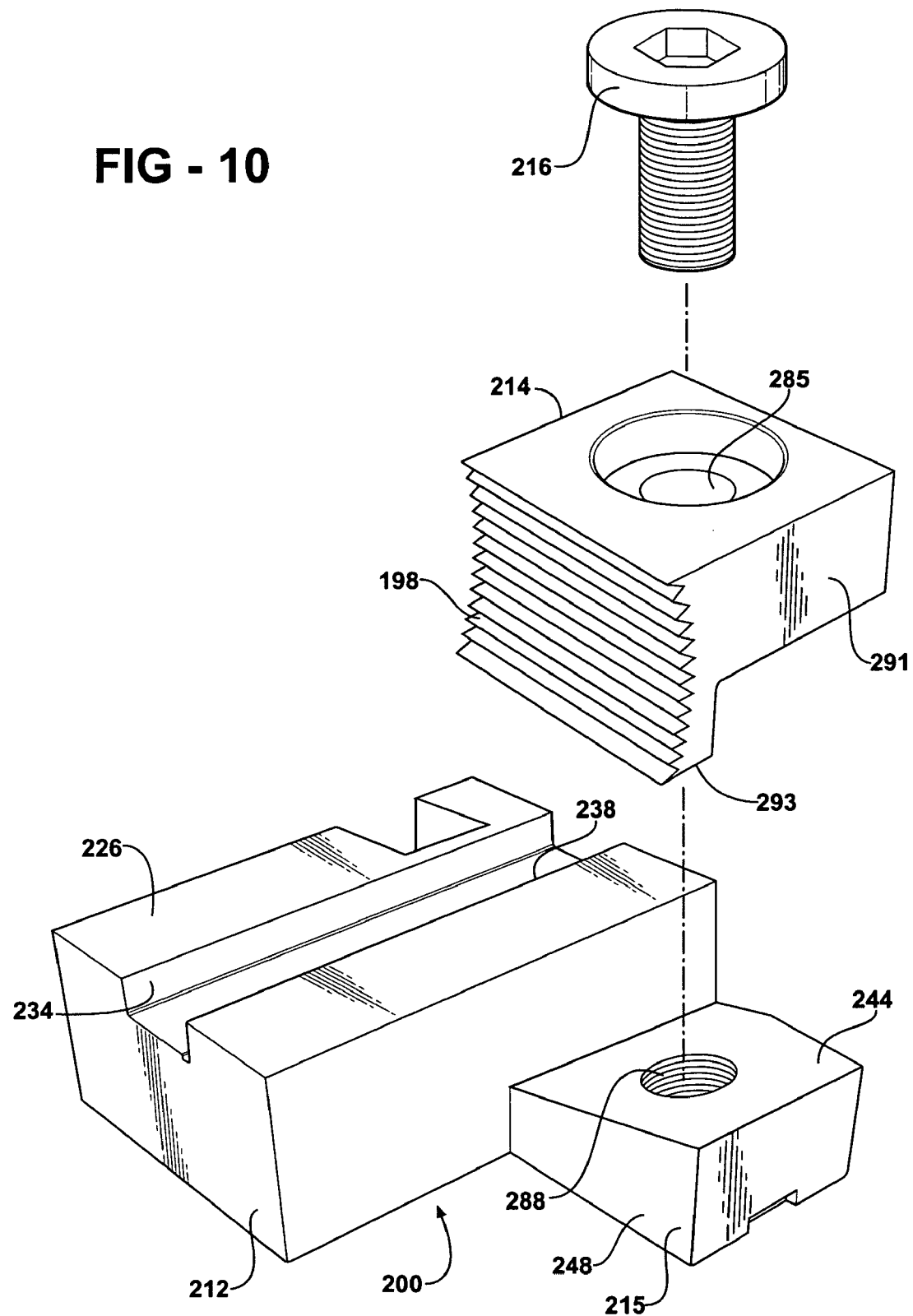
FIG. 10 is an expanded view of a thread-forming tool for a third chaser head that is in commercial use.

A thread forming tool assembly 200 shown in FIG. 9, for a third chaser head construction (not shown), includes a reusable steel tool holder 212 and a replaceable carbide tool 214. The tool holder 212 has a side projection 215 with tool engaging surfaces 244 and 248. A chaser head engaging flat surface 226 and a groove with wall surfaces 234 and 238 are provided for attaching the thread forming assembly to the chaser head. The tool engaging flat surface 244 on the projection 215, is parallel to the chaser head engaging flat surface 226. A flat stop surface 248, on the projection 215, extends from the flat surface 244 and is normal to the flat surface 244. A threaded bore 288 is provided, in the projection 215, and intersects the flat stop surface 244. The replaceable carbide tool 214 is an L-shaped member with a base 291 and a stem 293. A screw bore 285 with a counter sunk outside end extends through the base 291. The carbide tool 214 is positioned on the projection 215 with the base 291 in engagement with the flat surface 244 and the stem 293 in engagement with the surface 248. A threaded fastener 216 passes through the screw bore 285 and screws in to the threaded bore 288 in the projection 215 to hold the carbide tool 214 on the steel tool holder 212. Arcuate thread forming ridges 198 are formed in the surface of the base 291 and the stem 293 of the carbide tool by grinding groves into the base and the stem.

We claim:

1. A thread forming tool assembly for thread chaser heads comprising:

a steel holder block with a bottom, a top, a base end, a tool carrier end, a first side wall and a second side wall;

a chaser head engaging flat bottom surface on the bottom, a chaser head engaging flat side surface on the first side wall, and a chaser head clamp engaging flat surface on the second side wall;

a holder arcuate surface on the tool carrier end of the steel holder block facing away from the base end, and a fixed radius about an arcuate surface axis that is in a plane that is parallel to the chaser head engaging flat bottom surface and spaced from said top on the opposite side of the top from said bottom, a radially extending stop surface intersecting the arcuate surface at a valley and extending radially toward a stop surface axis that is vertically spaced above and parallel to the arcuate surface axis and wherein the radially extending stop surface terminates at a ridge on the tool carrier end, a threaded bore in the steel holder block, and a holder pin bore in the steel holder block that intersects the holder arcuate surface;

a carbide tool includes an arcuate tool surface that engages the holder arcuate surface on the steel holder block, a tool stop surface that engages the radially extending stop surface on the steel holder block, a tool pin slot in the holder arcuate surface that receives a tool pin mounted in the holder pin bore, and a carbide tool thread forming surface that is intersected by the arcuate tool surface and has a plurality of grooves in the carbide tool thread forming surface that form a plurality of thread forming ridges that form threads on work-pieces; and a screw that screws into the threaded bore in the steel holder block and clamps the carbide tool in the valley in the steel holder block.

2. A thread forming tool assembly for thread chaser heads comprising:

a steel holder block with a bottom, a top, a base end, a tool carrier end, a first side wall and a second side wall;

a chaser head engaging flat bottom surface on the bottom, a chaser head engaging flat side surface on the first side wall, and a chaser head clamp engaging flat surface on the second side wall;

a holder flat tool engaging surface on the tool carrier end of the steel holder block in a plane that is parallel to the chaser head engaging flat bottom surface and spaced from said top, a flat stop surface intersecting the flat tool engaging surface at a valley and facing toward the flat tool engaging surface, a threaded bore in the steel holder block, and a holder pin bore in the steel holder block that intersects the holder flat tool engaging surface;

a carbide tool including a tool flat bottom surface that engages the holder flat tool engaging surface on the steel holder block, a tool wall that engages the stop surface on the steel holder block, a tool pin slot in the carbide tool that receives a tool pin mounted in the holder pin bore to position the carbide tool along the length of said valley, and a carbide tool thread forming surface that is intersected by the arcuate tool surface and has a plurality of grooves in the carbide tool thread forming surface that form a plurality of thread forming ridges that form threads on work-pieces; and a screw that screws into the threaded bore in the steel holder block and clamps the carbide tool in the valley in the steel holder block.

* * * * *